UNITED STATES PATENT OFFICE.

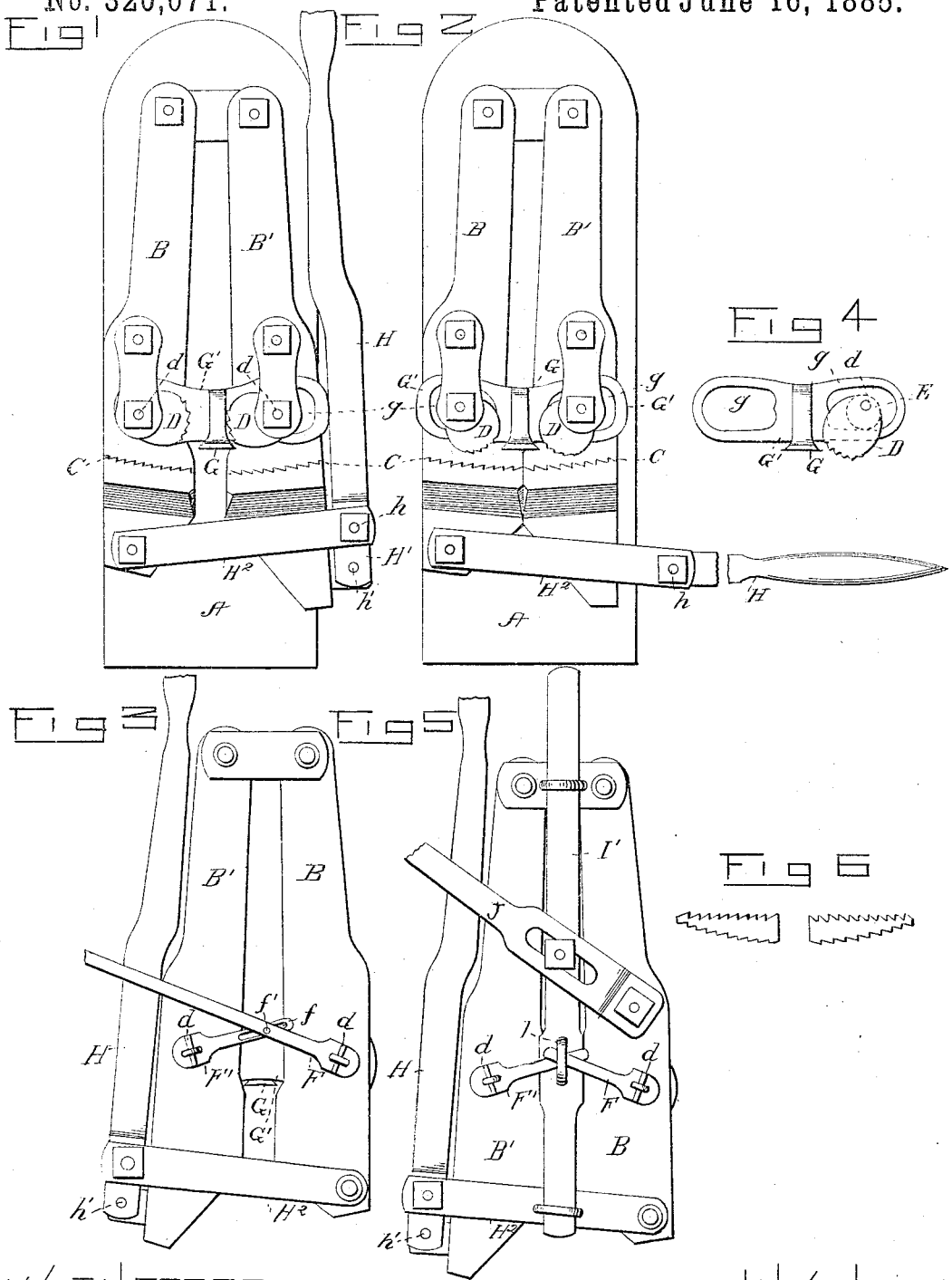

HENRY G. LANE, OF BUCYRUS, OHIO.

TIRE-SHRINKER.

SPECIFICATION forming part of Letters Patent No. 320,071, dated June 16, 1885.

Application filed March 12, 1885. (No model.)

*To all whom it may concern:*

Be it known that I, HENRY G. LANE, a citizen of the United States, residing at Bucyrus, in the county of Crawford and State of Ohio, have invented certain new and useful Improvements in Tire Shrinkers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention is an improvement in tire-shrinkers; and it consists in certain constructions and combinations of parts, as will be hereinafter described and claimed.

In the drawings, Figure 1 is a front view of the machine with the parts in position to receive a tire. Fig. 2 is a similar view with the parts in the position assumed when the tire has been shrunk. Fig. 3 is a back view of the operating devices. Fig. 4 shows the filling-block and one of the eccentrics. Fig. 5 represents a modification; and Fig. 6 is a detailed view of the removable blocks employed when the machine is used for shrinking straight iron, such as axles.

In carrying out my invention I usually provide a supporting-plate, A, on which to secure the several parts presently described. Near one end of this plate I pivot the beam B'. This beam is pivoted near its extremities, and but a slight distance from the beam B, which is fixed to the supporting-plate. The beam B' is movable on its pivot, so that its opposite end may be adjusted toward and from the corresponding end of the beam B. The beams B B', near the movable end of the latter, are provided with shoulders C C, slightly curved on their inner faces and in concentric lines. The inner faces of the jaws C are preferably serrated, as shown, to give the parts a better grip on the tire in operation.

To the beams B B', in front of the shoulders C, I pivot at $d$ the eccentric clamps D. To these clamps D, and below the same, I secure eccentrics E. (Shown in dotted lines, Fig. 4.) The purpose of these eccentrics E will more fully appear hereinafter.

The pivots $d$ of the clamps D extend below and are provided with levers F F'. One of these levers is slotted at $f$, and the other is extended to provide a handle whereby it may be operated, and has a pin, $f'$, which extends into the slot $f$ of the other lever, so that as the extended lever F' is operated it will effect an equal and corresponding operation of the lever F, so that the clamp will be turned by such lever F' from the position shown in Fig. 1, when the tire is about to be applied to the machine, to the position shown in Fig. 2, when the tire is in place ready to be shrunk.

The filling-block G has lateral arms or yokes G', which are provided with slots $g$, which slots fit over and are engaged by the eccentric E on the clamps D by such eccentric E. As the clamps are moved from the position shown in Fig. 1 to that shown in Fig. 2, the block G will be correspondingly moved, the purpose of such block being to fill the space between the clamps and prevent the spreading in that direction of the metal when compressed in shrinking the tire.

The lever H, which operates the beam B', is pivoted at $h$, and has its short arm H' pivotally connected at $h'$ with the beam B at the movable end thereof. I prefer to pivot the lever at $h$ to metallic straps $H^2$, which in turn are pivoted to the fixed beam B, as thereby a swinging pivot is provided for the said lever H, and an easier motion thereof is had.

It will be understood that instead of slotting one of the levers F F' and extending said levers to serve as a handle, and providing the extended lever with a pin fitted into the slot of the other lever, the said levers might be extended through an eye or loop, I, secured on a movable bar, I', and the said bar I' might in turn be operated by a lever, J, arranged and operating as will be understood from Fig. 5.

In the operation of my machine the parts are adjusted to the position shown in Fig. 1, the tire is heated, and its heated portion is placed between the clamps D D and the shoulders C. The said clamps are then adjusted to the position shown in Fig. 2, when they will bind firmly on the metal of the tire, when, by adjusting lever H to the position shown in Fig. 2, the beam B' will be moved to the position shown in said figure, and the heated portion of the tire will be condensed and the tire be shrunk, as desired. By the eccentrics E the filling-block G is moved back and forth as the eccentric clamps are adjusted, and when the tire is held by said clamp the block G rests in the position shown in Fig. 2 and prevents the metal from being forced between the clamps when the beam B' is forced toward the beam B, as described. It will be noticed that the shoulders C are curved so as to correspond with the curvature of the tire.

When it is desired to shrink axles or other bars of straight metal, I use the blocks shown in Fig. 6, which are fitted onto the shoulders C, as will be understood from the drawings.

Having thus described my invention, what I claim, and desire to secure by Letters Patent, is—

1. In a tire-shrinker, the combination of the clamps D, eccentrics E, attached thereto, pivots $d$, and interlocking levers F F', with the block G, filling the space between the clamps, and having lateral arms G', slotted to fit over the eccentrics, whereby upon the movement of said levers the block G is caused to move in unison with the clamps, as and for the purposes set forth.

2. The combination of the fixed beam, the movable beam, both provided with laterally-projecting bearing-shoulders C C between their ends, the straps $H^2$, pivoted at one end to the fixed beam, and the lever H, pivoted to the other end of the straps $H^2$ and having its short arm connected with the movable beam, substantially as set forth.

3. The improved tire-shrinker herein described, consisting of the fixed beam, the movable beam, both provided with bearing-shoulders C C, the clamp-blocks D, pivoted to the beams and provided with eccentrics E, levers whereby said clamps may be operated, and the filling-block having yokes G', provided with slots $g$, fitted over the eccentrics E, substantially as set forth.

In testimony whereof I affix my signature in presence of two witnesses.

HENRY G. LANE.

Witnesses:
A. WICKHAM,
ISAAC CAHILL.